(12) United States Patent
Sanchez et al.

(10) Patent No.: US 11,273,594 B2
(45) Date of Patent: Mar. 15, 2022

(54) MODIFYING DATA REPRESENTING THREE-DIMENSIONAL OBJECTS

(71) Applicant: HEWLETT-PACKARD DEVELOPMENT COMPANY, L.P., Houston, TX (US)

(72) Inventors: Salvador Sanchez, Sabadell (ES); Alejandro Manuel De Pena, Sant Cugat del Valles (ES); Aleix Oriol, Rubi (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 1029 days.

(21) Appl. No.: 15/111,604

(22) PCT Filed: Aug. 29, 2014

(86) PCT No.: PCT/US2014/053405
§ 371 (c)(1),
(2) Date: Jul. 14, 2016

(87) PCT Pub. No.: WO2015/108573
PCT Pub. Date: Jul. 23, 2015

(65) Prior Publication Data
US 2016/0332383 A1    Nov. 17, 2016

(30) Foreign Application Priority Data
Jan. 16, 2014    (EP) .................. PCT/EP2014/050841

(51) Int. Cl.
*B29C 64/393*    (2017.01)
*B29C 64/106*    (2017.01)
(Continued)

(52) U.S. Cl.
CPC ............ *B29C 64/106* (2017.08); *B29C 64/40* (2017.08); *B33Y 10/00* (2014.12); *B33Y 30/00* (2014.12);
(Continued)

(58) Field of Classification Search
CPC ..................................................... B29C 64/386
See application file for complete search history.

(56) References Cited

U.S. PATENT DOCUMENTS 5,111,236 A    5/1992   Lo
5,866,058 A    2/1999   Batchelder
(Continued)

FOREIGN PATENT DOCUMENTS

EP    1452298       9/2004
EP    2199068 A2    6/2010
(Continued)

OTHER PUBLICATIONS

European Patent Office, International Search Report for PCT/EP2014/050841 dated Sep. 25, 2014 (4 pages).
(Continued)

*Primary Examiner* — Timothy Kennedy
(74) *Attorney, Agent, or Firm* — HP Inc. Patent Department

(57) ABSTRACT

Nozzle data relating to a nozzle of an agent distributor to be used to deliver agent may be received, and data representing a three-dimensional object may be modified to cause the three-dimensional object to be shifted such that the nozzle is not to be used to generate the three-dimensional object.

20 Claims, 8 Drawing Sheets

(51) Int. Cl.
  *B33Y 50/00*   (2015.01)
  *B33Y 40/00*   (2020.01)
  *B29C 64/40*   (2017.01)
  *B33Y 10/00*   (2015.01)
  *B33Y 30/00*   (2015.01)
  *B33Y 50/02*   (2015.01)
(52) U.S. Cl.
  CPC .............. *B33Y 40/00* (2014.12); *B33Y 50/00* (2014.12); *B33Y 50/02* (2014.12)

(56) References Cited

U.S. PATENT DOCUMENTS

| | | |
|---|---|---|
| 6,799,959 B1 | 10/2004 | Tochimoto et al. |
| 7,407,256 B2 | 8/2008 | Han |
| 7,658,976 B2 | 2/2010 | Kritchman |
| 7,962,237 B2 | 6/2011 | Kritchman |
| 2003/0151167 A1 | 8/2003 | Kritchman et al. |
| 2005/0079086 A1 | 4/2005 | Farr et al. |
| 2006/0111807 A1 | 5/2006 | Gothait |
| 2006/0244169 A1 | 11/2006 | Monsheimer |
| 2010/0121476 A1 | 5/2010 | Kritchman |

FOREIGN PATENT DOCUMENTS

| | | |
|---|---|---|
| JP | 2007-529340 | 10/2007 |
| WO | WO-2006091842 | 8/2006 |
| WO | WO-2008151063 | 12/2008 |
| WO | WO-2013030064 | 3/2013 |

OTHER PUBLICATIONS

Jung-Su Kim et al.; 3D Printing Method of Multi Piezo Head Using a Photopolymer Resin; International Conference on Control, Automation and Systems 2007; Oct. 17-20, 2007; pp. 1-4.

Korean Intellectual Property Office, International Search Report and Written Opinion for PCT/US2014/053405 dated Feb. 26, 2015 (12 pages).

MODIFYING DATA REPRESENTING THREE-DIMENSIONAL OBJECTS

RELATED APPLICATIONS

This application claims priority to PCT Application No. PCT/EP2014/050841 filed on Jan. 16, 2014, entitled "GENERATING A THREE-DIMENSIONAL OBJECT", the entire contents of which are hereby incorporated herein by reference.

BACKGROUND

Additive manufacturing systems that generate three-dimensional objects on a layer-by-layer basis have been proposed as a potentially convenient way to produce three-dimensional objects. The quality of objects produced by such systems may vary widely depending on the type of additive manufacturing technology used.

BRIEF DESCRIPTION

Some examples are described with respect to the following figures.

Figure 2A:
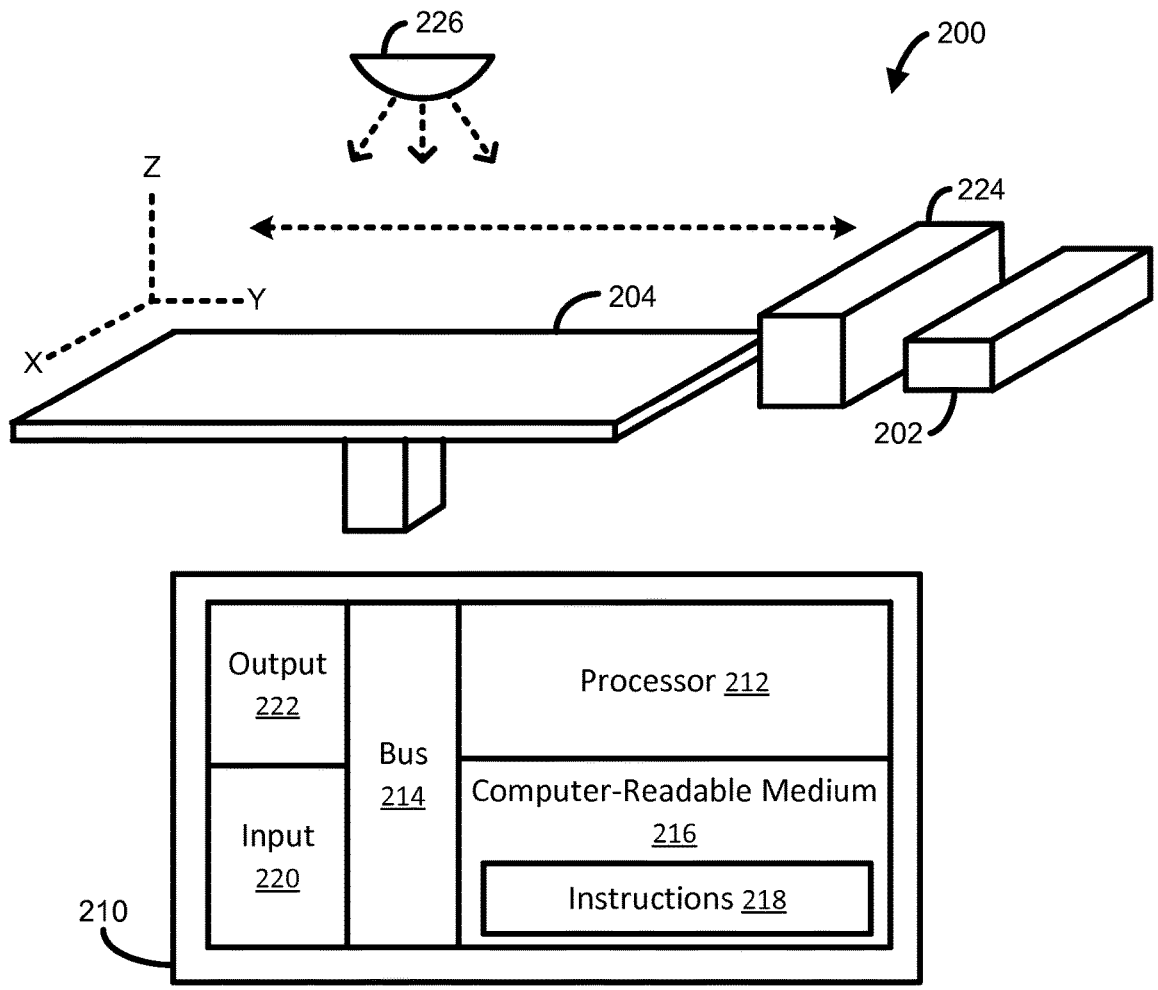
FIG. 2a is a simplified isometric illustration of an additive manufacturing system according to some examples.
Figure 2B:
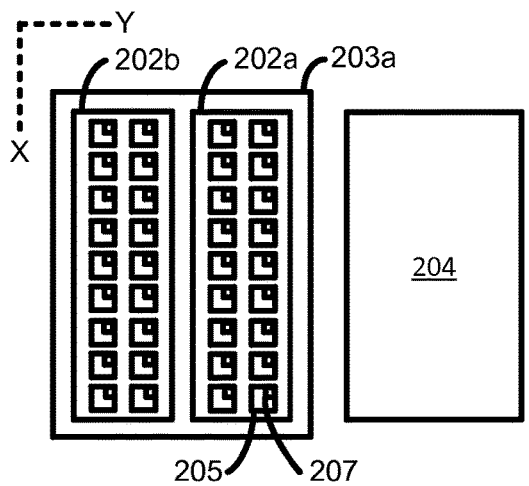
Figure 2C:
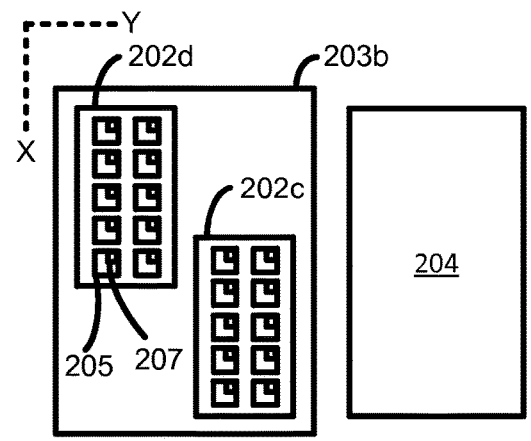
Figure 3:
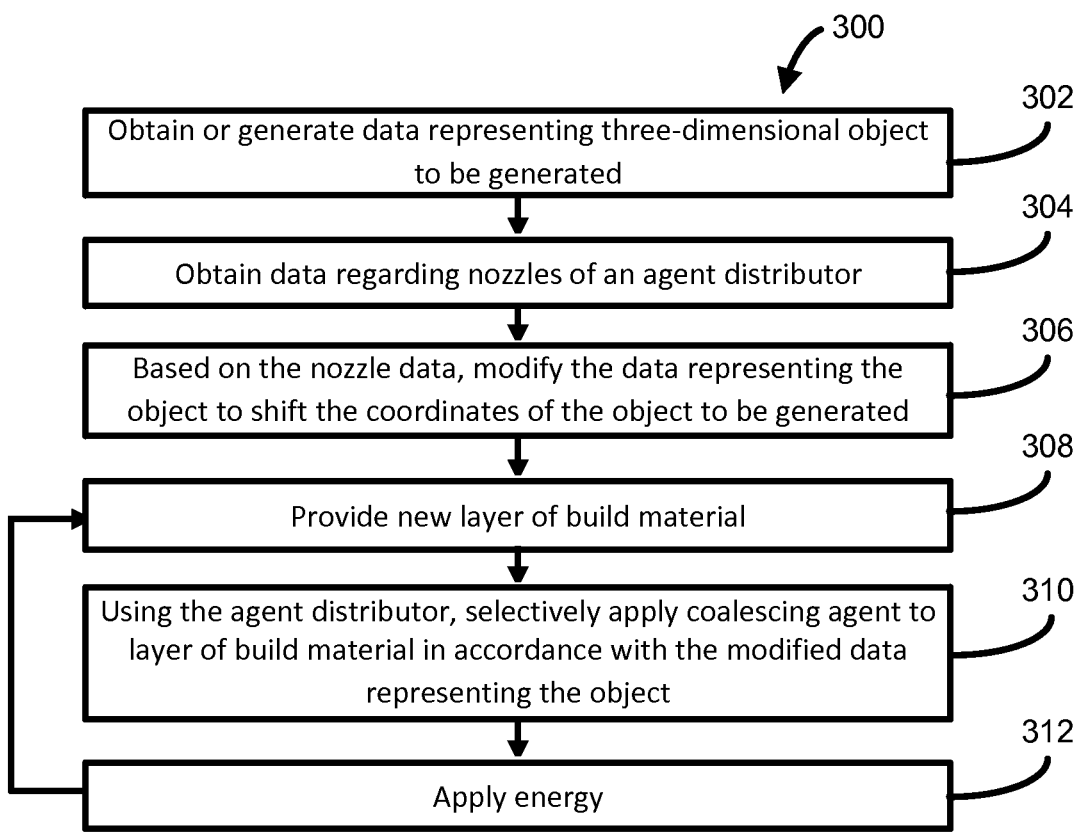
Figure 9:
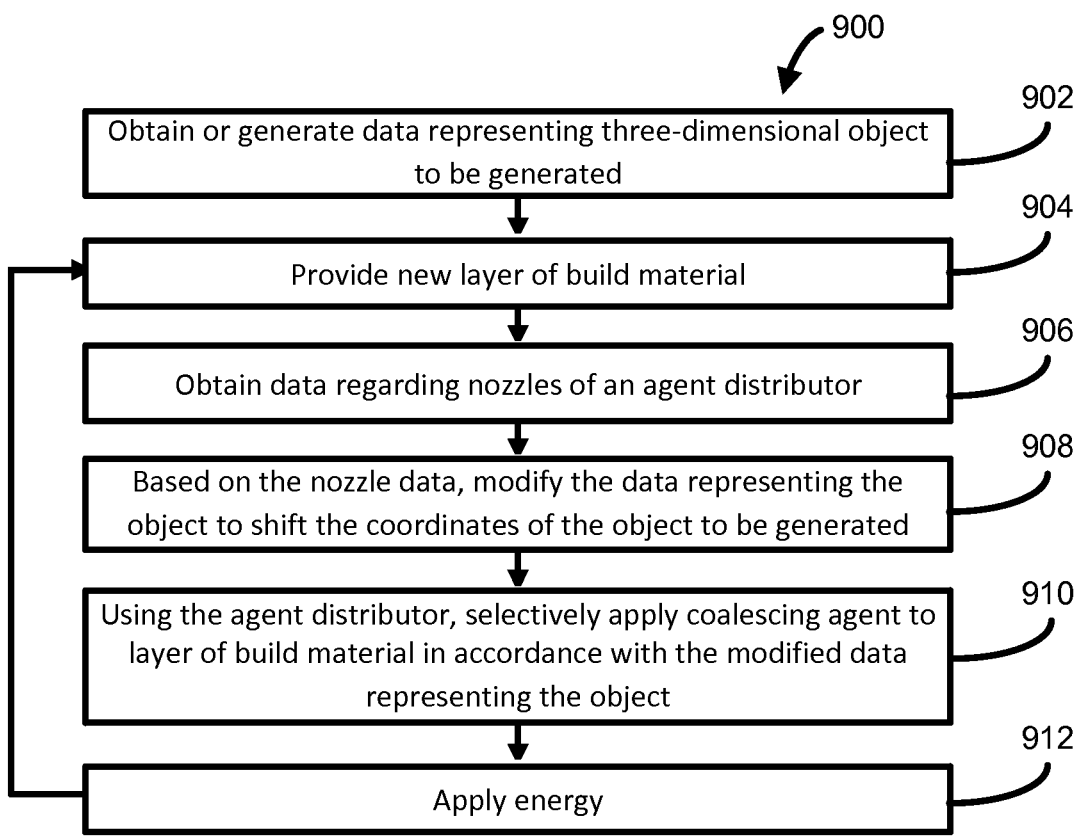
Figure 10A:
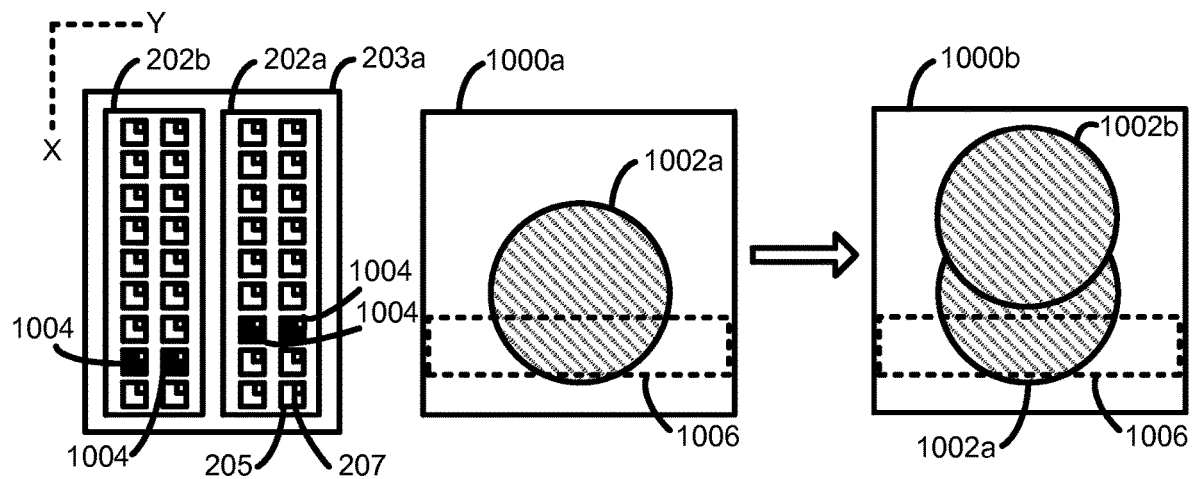
Figure 10B:
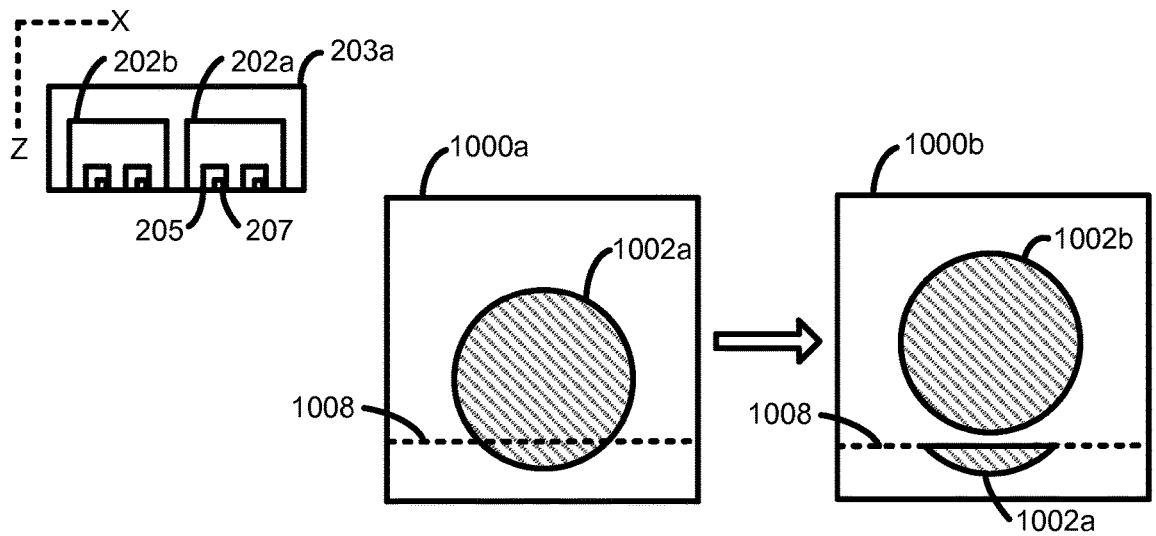

FIGS. 2b-c are simplified schematic views of agent distributors mounted on moveable carriages, and of support members, according to some examples;

FIG. 3 is a flow diagram illustrating a method of generating a three-dimensional object according to some examples;

FIGS. 4-7 each illustrate agent distributors, and data representing a three-dimensional object modified based on data regarding nozzles;

FIGS. 8a-d show a series of cross-sectional side views of layers of build material according to some examples;

FIG. 9 is a flow diagram illustrating a method of generating a three-dimensional object according to some examples; and FIGS. 10a-b each illustrate agent distributors, and data representing a three-dimensional object modified based on data regarding nozzles.

DETAILED DESCRIPTION

The following terminology is understood to mean the following when recited by the specification or the claims. The singular forms "a," "an," and "the" mean "one or more." For example, the term "a nozzle" means, in the claims and the description, "one or more nozzles." The terms "including" and "having" are intended to have the same inclusive meaning as the term "comprising."

Some additive manufacturing systems generate three-dimensional objects through the solidification of portions of successive layers of build material, such as a powdered or liquid build material. The properties of generated objects may be dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. In some examples, a multiple agent additive manufacturing system may be used such as that described in PCT Application No. PCT/EP2014/050841. For example, in addition to selectively delivering coalescing agent to layers build material, coalescence modifier agent may also be selectively delivered to layers of build material. A coalescence modifier agent may serve to modify the degree of coalescence of a portion of build material on which the coalescence modifier agent has been delivered or has penetrated. In yet other examples, other methods of solidification may be used, for example selective laser sintering (SLS), light polymerization, among others. The examples described herein may be used with any of the above additive manufacturing systems and suitable adaptations thereof.

In some examples, certain nozzles in agent distributors such as printheads may malfunction, e.g. become partially or completely clogged, therefore some agent may not be delivered on portions of build material as intended, and these portions of build material may not therefore become solidified as intended. Thus, generated objects may not be faithful reproductions of three-dimensional object model used to generate the object. In some examples, nozzles may become clogged to due to problems in the printing process.

In some examples, a single nozzle may be used to print at each addressable location, while in other examples, there may be nozzle redundancy in the sense that multiple nozzles may be used to print at each address location. In either of these cases, for example, some nozzles of an agent distributor may be over-used relative to other nozzles of the agent distributor. In some examples, overuse of a nozzle may cause the nozzle to deliver drops of undesirably greater size.

Accordingly, the present disclosure provides, in some examples, shifting the coordinates of an object in response to data regarding the nozzles, such as data regarding whether the nozzles are malfunctioning or data regarding nozzle usage. Thus, for example, unclogged and/or less used nozzles may be used to generate the object.

Figure 1A:
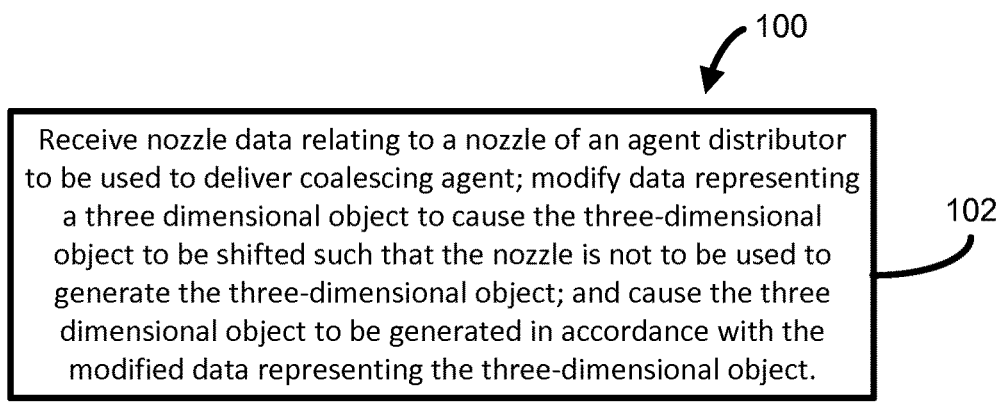
FIG. 1a illustrates a system for generating a three-dimensional object according to some examples.

FIG. 1a is a block diagram illustrating a system 100 for generating a three-dimensional object according to some examples. The system 100 may include a processor 102 to receive nozzle data relating to a nozzle of an agent distributor to be used to deliver agent. The processor 102 may be to modify data representing a three dimensional object to cause the three-dimensional object to be shifted such that the nozzle is not to be used to generate the three-dimensional object. The processor 102 may be to cause the three dimensional object to be generated in accordance with the modified data representing the three-dimensional object.

Figure 1B:
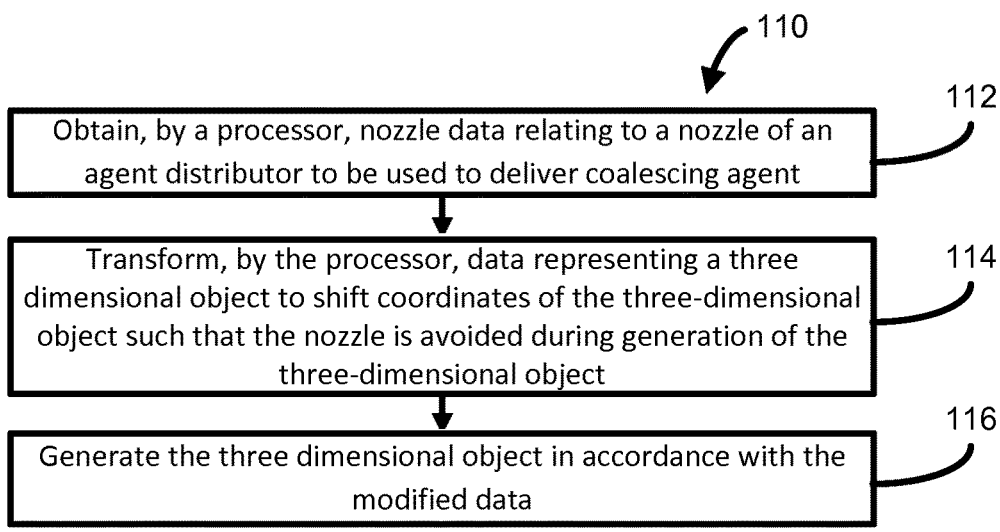
FIG. 1b is a flow diagram illustrating a method according to some examples.

FIG. 1b is a flow diagram illustrating a method 110 according to some examples. At 112, nozzle data may be obtained by a processor. The nozzle data may relate to a nozzle of an agent distributor to be used to deliver agent. At 114, data representing a three dimensional object may be transformed by the processor to cause the three-dimensional object to be shifted such that the nozzle is avoided during generation of the three-dimensional object. At 116, the three dimensional object may be generated in accordance with the modified data.

Figure 1C:
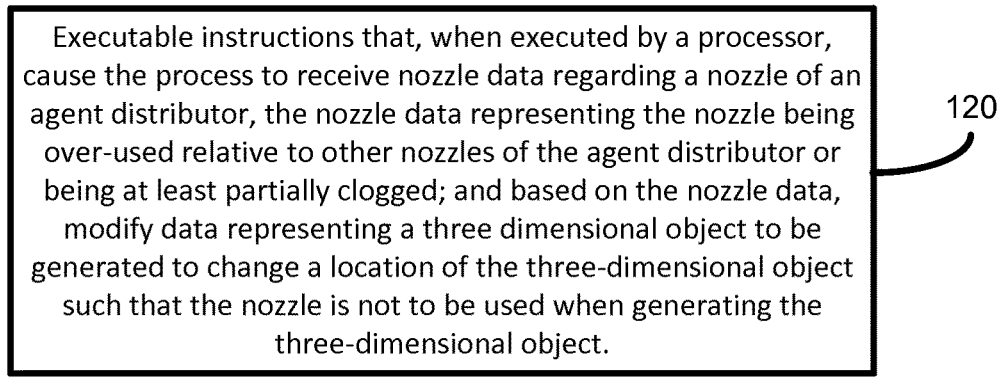
FIG. 1c is a block diagram illustrating a non-transitory computer readable storage medium according to some examples.

FIG. 1c is a block diagram illustrating a non-transitory computer readable storage medium 120 according to some examples. The non-transitory computer readable medium 120 may include executable instructions that, when executed by a processor, may cause the processor to receive nozzle data regarding a nozzle of an agent distributor. The nozzle data may represent the nozzle malfunctioning or being over-used relative to other nozzles of the agent distributor. The non-transitory computer readable medium 120 may include executable instructions that, when executed by the processor, may cause the processor to modify, based on the nozzle data, data representing a three dimensional object to be generated to change a location of the three-dimensional object such that the nozzle is not to be used when generating the three-dimensional object.

FIG. 2a is a simplified isometric illustration of an additive manufacturing system 200 according to some examples. The system 200 may be operated, as described further below with reference to the flow diagram of FIG. 3 to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powdered ceramic materials, powdered glass materials, powdered resin material, powdered polymer materials, and the like, and combinations thereof. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material.

The additive manufacturing system 200 may include a system controller 210. Any of the operations and methods disclosed herein may be implemented and controlled in the additive manufacturing system 200 and/or controller 210.

The controller 210 may include a processor 212 for executing instructions that may implement the methods described herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The controller 210 may support direct user interaction. For example, the additive manufacturing system 200 may include user input devices 220 coupled to the processor 212, such as a keyboard, touchpad, buttons, keypad, dials, mouse, track-ball, card reader, or other input devices. Additionally, the additive manufacturing system 200 may include output devices 222 coupled to the processor 212, such as a liquid crystal display (LCD), printer, video monitor, touch screen display, a light-emitting diode (LED), or other output devices. The output devices 222 may be responsive to instructions to display textual information or graphical data.

The processor 212 may be in communication with a computer-readable storage medium 216 via a communication bus 214. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any of the methods or operations disclosed herein according to various examples.

The system 200 may include a coalescing agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light absorbers are dye based colored ink and pigment based colored ink, such as inks commercially known as CM993A and CE042A available from Hewlett-Packard Company. In some examples, the agent distributor 202 may be used to selectively deliver, e.g. deposit, coalescing agent when in the form of suitable fluids such as a liquid. The controller 210 controls the selective delivery of coalescing agent to a layer of provided build material in accordance with agent delivery control data of the instructions 218. The coalescing agent distributor 202 may include a supply of coalescing agent or may be connectable to a separate supply of coalescing agent.

FIG. 2b is a simplified schematic view of an agent distributor having multiple printheads 202a-b mounted on a moveable carriage 203a, and of the support member 204, according to some examples, and FIG. 2c is a simplified schematic view of multiple agent distributors 202c-d mounted on a moveable carriage 203b, and of the support member 204, according to some examples. Each of these configurations may be used in the system 200. The agent distributors 202a-d may each have similar features as the agent distributer 202 described earlier.

In FIG. 2b, each of the agent distributors 202a-b has a length that enables it to span the whole width of the support member 204 in a so-called page-wide array configuration. In some examples, each agent distributor 202a-b may be a single printhead having an array of nozzles having a length to enable it to span the width of the support member 204 along the illustrated x-axis, as shown in FIG. 2b. In other examples, a suitable arrangement of multiple printheads may be placed in-line to achieve a page-wide array configuration. Thus, using the carriage 203a, the agent distributors 202a-b may be movable bi-directionally across the length of the support member 204 along the illustrated y-axis. This enables selective delivery of coalescing agent across the whole width and length of the support member 204 in a single pass.

In FIG. 2c, each of the agent distributors 202c-d may have a shorter length that does not enable it to span the whole width of the support member 204. In this example, each of the agent distributors 202c-d may be laterally movable along the entire width of the support member 204 along the illustrated x-axis. Thus, using the carriage 203b, the agent distributors 202c-d may be movable bi-directionally across the length of the support member 204 along the illustrated y-axis. This enables selective delivery of coalescing agent across the whole width and length of the support member 204 in multiple passes.

As shown in FIGS. 2b-c, each of the agent distributors 202 and 202a-d may be printheads, such as a thermal inkjet printhead or a piezo inkjet printhead. Each printhead may have arrays of nozzles 205. In one example, printheads such as those commonly used in commercially available inkjet printers may be used. In other examples, the agents may be delivered through spray nozzles rather than through printheads. Other delivery mechanisms may be used as well.

A respective nozzle sensor 207 may be coupled to each nozzle 205. The nozzle sensor 207 may, for example, be a drop detector. Each sensor 207 may be to detect whether its respective nozzle 205 is malfunctioning, e.g. partially or completely clogged. In some examples, the drop detector may include a light emitting diode (LED) and a photoreceptor, such as a photodiode or charge coupled device (CCD), on separate sides of the fluid path in the nozzle. The LED may generate light, and the photoreceptor may detect the light from the LED, creating a light path which may be substantially perpendicular to the fluid path. A disruption in the light path may occur when a drop of fluid passes through the light path. Thus, it may be inferred that if reduced disruptions of the light path are detected, then the nozzle 205 is partially clogged, and if no disruptions of the light path are detected, then the nozzle 205 is completely clogged. In other examples, the drop detector may include an electrostatic detection mechanism in which a passing drop of fluid may cause an electrostatic differential on a plate. In other examples, an agent distributor having the nozzles 205 may be to perform indexing movements along the x-axis to allow each nozzle to attempt to deliver agent on build material at different locations along the x-axis. Then, an optical sensor may be moved along the carriage to detect, for each nozzle 205, whether any drops of agent were not successfully delivered, indicating that the respective nozzle 205 is clogged. In other examples, other types of sensors 207 may be used. In some examples, each nozzle sensor 207 may detect how many drops have been ejected by its respective nozzle 205. In some examples, other types of sensors may be used. Data representing any of the above measurements may be provided to the controller 210.

In some examples, based on the measurements, the controller 210 may determine usage of the nozzles 205, for example the total amount of drops delivered by the nozzle 205 in its lifetime, the frequency of the usage of the nozzle 205, and/or whether the nozzle 205 has not been used for more than a predetermined amount of time, etc. In other examples, the controller 210 may instead generate the data based on instructions 218 such as the agent delivery control data, which may define drops of agent to be delivered by each nozzle 205.

In some examples, the agent distributors may be fixed rather than movable, and the support member 204 may move relative to the agent distributors.

It should be noted that the term 'width' used herein is used to generally denote the shortest dimension in the plane parallel to the x and y axes illustrated in FIGS. 2a-c, whilst the term 'length' used herein is used to generally denote the longest dimension in this plane. However, it will be understood that in other examples the term 'width' may be interchangeable with the term 'length'.

The system 200 may further comprise a build material distributor 224 to provide, e.g. deliver or form, successive layers of build material on the support member 204. Suitable build material distributors 224 may include, for example, a wiper blade and a roller. Build material may be supplied to the build material distributor 224 from a hopper or build material store. In the example shown the build material distributor 224 moves across the length (y-axis) of the support member 204 to deposit a layer of build material. As previously described, a layer of build material will be deposited on the support member 204, whereas subsequent layers of build material will be deposited on a previously deposited layer of build material. The build material distributor 224 may be a fixed part of the system 200, or may not be a fixed part of the system 200, instead being, for example, a part of a removable module. In some examples, the build material distributor 224 may be mounted on the carriage 203a or 203b.

In some examples, the build material distributor 224 may be to provide a layer of build material having a thickness in the range of between about 50 to about 300 microns, or about 90 to about 110 microns, or about 250 microns, although in other examples thinner or thicker layers of build material may be provided. The thickness may be controlled by the controller 210, for example based on the instructions 218.

In some examples, there may be any number of additional agent distributors and build material distributors relative to the distributors shown in FIGS. 2a-c. In some examples, as shown in FIGS. 2b-c, the distributors of system 200 may be located on the same carriage, either adjacent to each other or separated by a short distance. In other examples, two or more carriages each may contain distributors. For example, each distributor may be located in its own separate carriage. Any additional distributors may have similar features as those discussed earlier with reference to the coalescing agent distributor 202. However, in some examples, different agent distributors may deliver different coalescing agents and/or coalescence modifier agents, for example.

In the example shown the support member 204 is moveable in the z-axis such that as new layers of build material are deposited a predetermined gap is maintained between the surface of the most recently deposited layer of build material and lower surface of the agent distributor 202. In other examples, however, the support member 204 may not be movable in the z-axis and the agent distributor 202 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage 203*a* or 203*b*.

In other examples, the energy source 226 may apply a variable amount of energy as it is moved across the layer of build material, for example in accordance with instructions 208. For example, the controller 210 may control the energy source to apply energy to portions of build material on which coalescing agent has been applied, but not to portions on which coalescing agent has not been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

The combination of the energy supplied, the build material, and the coalescing agent may be selected such that: i) portions of the build material on which no coalescing agent have been delivered do not coalesce when energy is temporarily applied thereto; ii) portions of the build material on which coalescing agent has been delivered or has penetrated coalesce when energy is temporarily applied thereto do coalesce.

In some examples, the system 200 may additionally comprise a pre-heater to maintain build material deposited on the support 204 within a predetermined temperature range. Use of a pre-heater may help reduce the amount of energy that has to be applied by the energy source 226 to cause coalescence and subsequent solidification of build material on which coalescing agent has been delivered or has penetrated.

The controller 210 may obtain or generate agent delivery control data 208 which may define for each slice of the three-dimensional object to be generated the portions or the locations on the build material, if any, at which agent is to be delivered.

In some examples, the agent delivery control data 208 may be generated based on object design data representing a three-dimensional model of an object to be generated, and/or from object design data representing properties of the object. The model may define the solid portions of the object, and may be processed by the three-dimensional object processing system to generate slices of parallel planes of the model. Each slice may define a portion of a respective layer of build material that is to be solidified by the additive manufacturing system. The object property data may define properties of the object such as density, surface roughness, strength, and the like.

The object design data and object property data may be received, for example, from a user via an input device 220, as input from a user, from a software driver, from a software application such as a computer aided design (CAD) application, or may be obtained from a memory storing default or user-defined object design data and object property data.

In some examples the object processing system may obtain data relating to characteristics of the additive manufacturing system 200. Such characteristics may include, for example, build material layer thickness, properties of the coalescing agent, properties of the build material, and properties of the energy source 226, properties of the heater 230, and properties of the temperature sensor 228.

The agent delivery control data 208 may describe, for each layer of build material to be processed, locations or portions on the build material at which coalescing agent is to be delivered. In one example the locations or portions of the build material at which coalescing agent is to be delivered are defined by way of respective patterns.

FIG. 3 is a flow diagram illustrating a method 300 of generating a three-dimensional object according to some examples. Aspects of the method may be computer implemented. In some examples, the orderings shown may be varied, such that some elements may occur simultaneously, some elements may be added, and some elements may be omitted.

Figure 6:
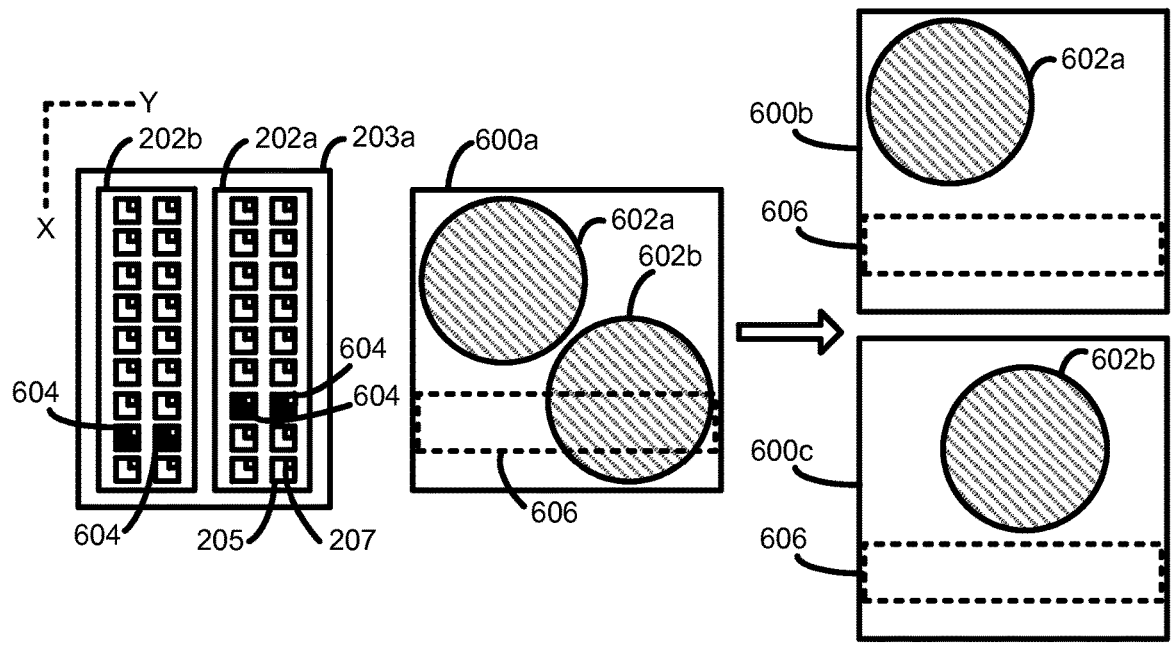
Figure 7:
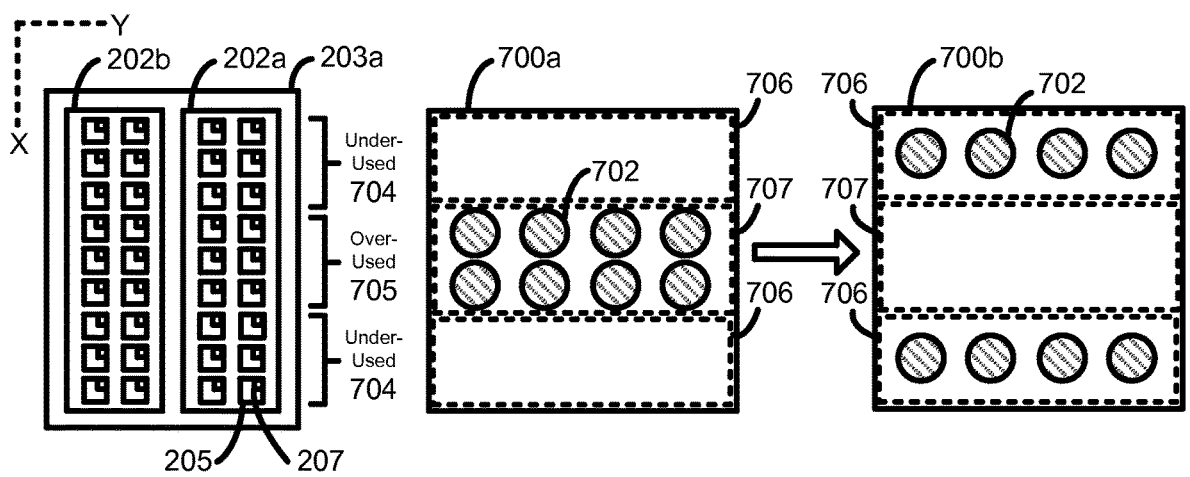
Figure 8A:
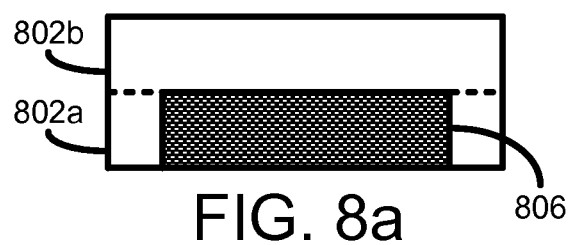
Figure 8B:
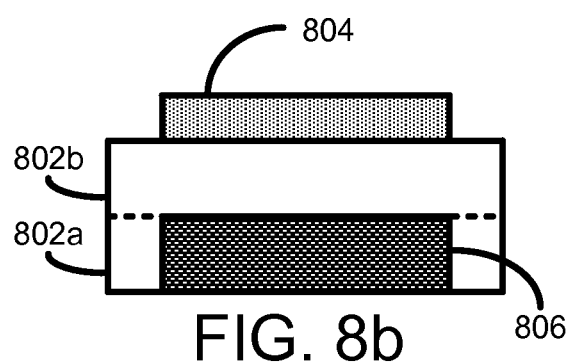
Figure 8C:
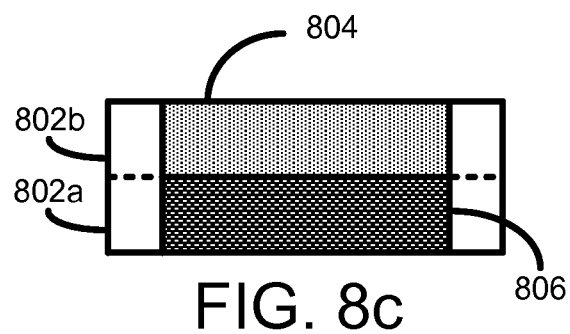

In describing FIG. 3, reference will be made to FIGS. 2, 4-7, and 8*a-c*. FIGS. 4-7 each illustrate agent distributors, and data representing a three-dimensional object modified based on data regarding nozzles. As shown, each of FIGS. 4-7 include the carriage 203*a* of FIG. 2*b* having agent distributors 202*a-b*. However, in other examples, the methods herein may use the carriage 203*b* of FIG. 2*c* or other carriages and agent distributors. Additionally, FIGS. 4-7 respectively include original data 400*a*, 500*a*, 600*a*, and 700*a* representing the three-dimensional object to be generated, and respectively include data 400*b*, 500*b*, 600*b-c*, and 700*b* that are each generated based on modifications to the respective original data 400*a*, 500*a*, 600*a*, and 700*a*. FIGS. 4-7 show a schematic view of the agent distributors 202*a-b*, and x-y cross sections of the data 400*a-b*, 500*a-b*, 600*a-c*, and 700*a-b*. FIGS. 8*a-c* show a series of cross-sectional side views of layers of build material according to some examples.

At 302, data representing the three dimensional object may be generated or obtained by the controller 210. "Data representing the three dimensional object" is defined herein to include any data defining the object from its initial generation as a three dimensional object model, to its conversion into slice data, and to its conversion into a form suitable for controlling an agent distributor. Such data is also defined to include data used by an agent distributor to define which nozzles of an agent distributor to use. Thus, it is understood that "data representing the three dimensional" object includes, for example, both (1) data corresponding to locations on a support member such that the object may be shifted to be generated in a different portion of the platform, e.g. if the support member is fixed, or (2) data corresponding to nozzles of an agent to be used even where the location of the object to be generated on the platform is not shifted, but rather the support member is shifted, e.g. if the support member is movable, such that the "shifting" of the object herein may correspond to different nozzles being used.

At 304, data regarding the nozzles 205 of the agent distributors may be obtained and/or generated by the controller 210.

Figure 4:
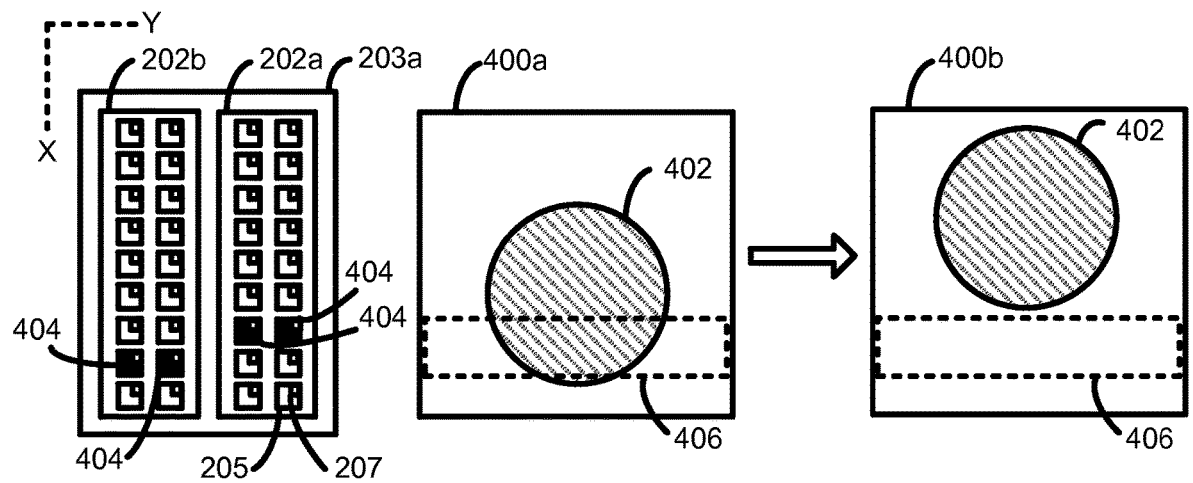
Figure 5:
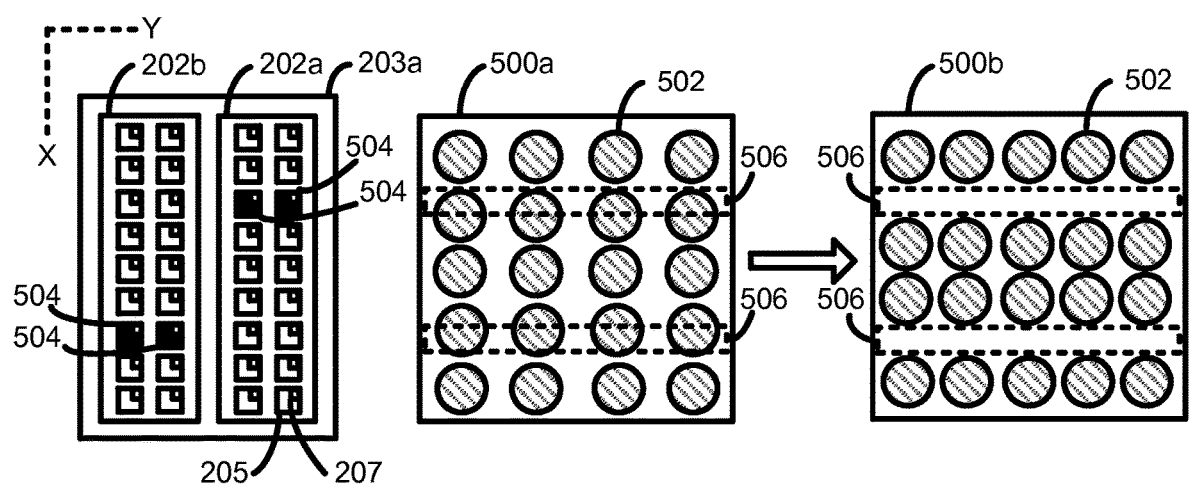

In some examples, the data may represent measurements by the nozzle sensors 207 of the nozzles 205. For example, each nozzle sensor 207 may measure whether its respective nozzle 205 is malfunctioning, e.g. partially or completely clogged, as discussed earlier. In the examples of FIGS. 4-6, nozzles 404, 504, and 604 may be detected as malfunctioning. Thus, the controller 210 may identify, in the data 400*a*, 500*a*, and 600*a*, respective zones 406, 506, and 606 corresponding to the malfunctioning nozzles 404, 504, and 604. If the zones 406, 506, or 606 include objects, e.g. a part or all of an object, then such objects may be moved to different regions in the data corresponding to functioning nozzles, as will be described.

In other examples, the data may represent the usage of each nozzle 205, for example the total amount of drops delivered by the nozzle 205 in its lifetime, the frequency of the usage of the nozzle 205, and/or whether the nozzle 205 has not been used for more than a predetermined amount of time, etc. In some examples, the data representing the usage of each nozzle 205 may be based on the measurements by the nozzle sensors 207 of how many drops have been ejected by each nozzle 205. In other examples, the controller 210 may instead generate the data based on instructions 218 such as data representing previous use of the nozzle 205 in generating three-dimensional objects. In the example of FIG. 7, it may be determined according to any of the methods above that the usage of the central nozzles 706 is be higher than the usage of the peripheral nozzles 704. Thus, the controller 210 may identify peripheral zones 706 corresponding to the peripheral nozzles 704 and central zone 707 corresponding to the central nozzles 705. The under-usage of the peripheral nozzles 704 relative to the central nozzles 705 may occur over time, for example, because data representing three dimensional objects may typically define objects to be printed at the center of the build material area.

At 306, the data representing the three-dimensional object may be modified, based on the data regarding the nozzles, to shift the coordinates of an object and/or to cancel an object. For example, the shift may occur if the object was in a region of the data corresponding to a malfunctioning or over-used nozzle. The object may thus be shifted to a region in which the corresponding nozzles are functioning, e.g. unclogged, and/or under-used relative to the over-used nozzles.

In some examples, the data may include a plurality of slice data, wherein each slice data, for example agent delivery control data, represents a build area in which a two-dimensional slice of an object is located. Thus, each slice may be moved to a different location in its respective area of the slice data, such that the coordinates of the object as a whole may be shifted. Each slice may be moved the same amount to ensure that the whole object is moved.

In other examples, the data may include three-dimensional object data, such as the object design data, wherein the data represents a build volume in which the three-dimensional object is to be located. Thus, the object may be moved to a different location in the volume of the data, such that the coordinates of the object as a whole may be shifted.

In the example of FIG. 4, the data 400*b* is generated based on modifications to the original data 400*a*. The object 402 is shifted out of the region 406 corresponding to the malfunctioning nozzles 404.

In the example of FIG. 5, the data 500*b* is generated based on modifications to the original data 500*a*. The controller 210 may identify twenty objects 502. For example, the controller 210 may identify that the twenty objects 502 are separate from one another, e.g. that they each do not contact any other objects. The controller 210 may analyze three-dimensional data or a collection of slice data. The data may be a vector format, or any other format in which the controller 210 may identify that the objects 502 are separate. The twenty objects 502 are each shifted such that none of the objects 502 are in the regions 506 corresponding to the malfunctioning nozzles 504. In other examples, some but not others of the objects are shifted to avoid the regions 506.

In the example of FIG. 6, the data 600*b* and 600*c* are generated based on modifications to the original data 600*a*. In data 600*a*, object 602*a* is not in the zone 606 corresponding to malfunctioning nozzles 604, and object 602*b* is in the zone corresponding to malfunctioning nozzles 602. However, there is not enough space in the area or volume to allow both objects 602*a* and 602*b* to be generated without using the nozzles 604 corresponding to the forbidden zone 606. Thus, in the generated data 600*b* used for one build process, one of the objects, in this example 602*b*, is cancelled. Meanwhile object 602*a* is not shifted as it is not located in the zone 606. In some examples, as shown in FIG. 6, data 600*c* may be generated representing another build to generate the object 602*b* cancelled in data 600*b*. Thus, two build processes in the build volume may be performed to generate both objects 602*a* and 602*b*.

In the example of FIG. 7, the data 700*b* is generated based on modifications to the original data 700*a*. The eight objects 702 are each shifted such that none of the objects 702 are in the regions 706 corresponding to the under-used nozzles 704 rather than in the regions 707 corresponding to the over-used nozzles 705. In other examples, some but not others of the objects may be shifted to avoid the regions 707.

Iterations of 308 to 312 may then be performed to generate the three-dimensional object.

At 308, a layer 802*b* of build material may be provided, as shown in FIG. 8*a*. For example, the controller 210 may control the build material distributor 224 to provide the layer 802*b* on a previously completed layer 802*a* on the support member 204 by causing the build material distributor 224 to move along the y-axis as discussed earlier. The completed layer 802*a* may include a solidified portion 806. Although a completed layer 802*a* is shown in FIGS. 8*a*-*d* for illustrative purposes, it is understood that 308 to 312 may initially be applied to generate the first layer 802*a*.

At 310, as shown in FIG. 8*b*, coalescing agent 804 may be selectively delivered to the surface of portions of the layer 802*b*. As discussed earlier, the agent 804 may be delivered by agent distributor 802, for example in the form of fluids such as liquid droplets.

The selective delivery of the agent 804 may be performed in patterns on the portions of the layer 802*b* that the data representing the three-dimensional object, e.g. data 400*b*, 500*b*, 600*b*, 600*c*, or 700*b*, may define to become solid to form part of the three-dimensional object being generated. "Selective delivery" means that agent may be delivered to selected portions of the surface layer of the build material in various patterns.

In some examples, coalescence modifier agent may similarly be selectively delivered to portions of the layer 602*b*.

In the examples of FIGS. 8*a*-8*d*, for illustrative purposes the patterns of the agent 804 correspond to cross-sectional side views of the object 402 defined in 400*b*. However, other patterns, including the patterns defined in data 500*b*, 600*b*, 600*c*, or 700*b*, may be used.

FIG. 8*c* shows coalescing agent 804 having penetrated substantially completely into the portions of the layer 802*b* of build material, but in other examples, the degree of penetration may be less than 100%. The degree of penetration may depend, for example, on the quantity of agent delivered, on the nature of the build material, on the nature of the agent, etc.

Figure 8D:
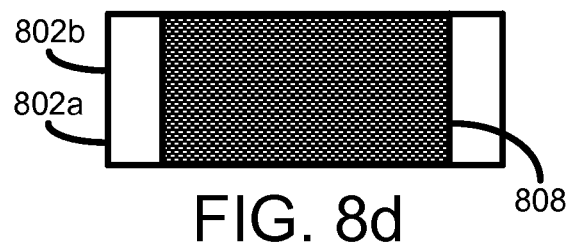

At 312, a predetermined level of energy may be temporarily applied to the layer 802*b* of build material. In various examples, the energy applied may be infra-red or near infra-red energy, microwave energy, ultra-violet (UV) light, halogen light, ultra-sonic energy, or the like. The temporary application of energy may cause the portions of the build material on which coalescing agent 804 was delivered to heat up above the melting point of the build material and to coalesce. In some examples, the energy source may be focused. In other examples, the energy source may be unfocused, and the temporary application of energy may cause the portions of the build material on which coalescing agent 804 has been delivered or has penetrated to heat up above the melting point of the build material and to coalesce. For example, the temperature of some or all of the layer 802*b* may achieve about 220 degrees Celsius. Upon cooling, the portions having coalescing agent 804 may coalesce may become solid and form part of the three-dimensional object being generated, as shown in FIG. 8*d*.

As discussed earlier, one such solidified portion 806 may have been generated in a previous iteration. The heat absorbed during the application of energy may propagate to the previously solidified portion 806 to cause part of portion 806 to heat up above its melting point. This effect helps creates a portion 808 that has strong interlayer bonding between adjacent layers of solidified build material, as shown in FIG. 8*d*.

After a layer of build material has been processed as described above in 308 to 312, new layers of build material may be provided on top of the previously processed layer of build material. In this way, the previously processed layer of build material acts as a support for a subsequent layer of build material. The process of 308 to 312 may then be repeated to generate a three-dimensional object layer by layer.

FIG. 9 is a flow diagram illustrating a method 900 of generating a three-dimensional object according to some examples. Aspects of the method may be computer implemented. In some examples, the orderings shown may be varied, such that some elements may occur simultaneously, some elements may be added, and some elements may be omitted.

In describing FIG. 9, reference will be made to FIGS. 2, 4-7, 8*a-c*, and 10*a-b*. As shown, FIGS. 10*a-b* include the carriage 203*a* of FIG. 2*b* having agent distributors 202*a-b*. In other examples, the methods herein may use the carriage 203*b* of FIG. 2*c* or other carriages and agent distributors. Additionally, FIGS. 10*a-b* include original data 1000*a* representing the three-dimensional object to be generated, and include data 1000*b* that is generated based on modifications to the original data 1000*a*. FIG. 10*a* shows a schematic view of the agent distributors 202*a-b*, and an x-y cross section of the data 1000*a-b*. FIG. 10*b* shows a schematic view of the agent distributors 202*a-b*, and an x-z cross section of the data 1000*a-b*.

At 902, data representing the three dimensional object may be generated or obtained by the controller 210.

Iterations of 904 to 912 may then be performed to generate the three-dimensional object.

At 904, a layer 802*b* of build material may be provided, as shown in FIG. 8*a*. This may be done in a similar way as described earlier relative to 308 of FIG. 3. Although a completed layer 802*a* is shown in FIGS. 8*a-d* for illustrative purposes, it is understood that 904 to 912 may initially be applied to generate the first layer 802*a*.

At 906, data regarding the nozzles 205 of the agent distributors may be obtained and/or generated by the controller 210. This may be done in a similar way as described earlier relative to 304 of FIG. 3, including the detections regarding the nozzles of FIGS. 4-7, as discussed earlier. For example, the data may represent measurements by the nozzle sensors 207 of the nozzles 205, and/or may represent the usage of each nozzle 205. However, in this example the data may be obtained during the build process during generation of each layer. In this way, modifications to the build may be made on the fly based on the nozzle data, as will be described.

In the example of FIGS. 10*a-b*, nozzles 1004 may be detected as malfunctioning, e.g. partially clogged or completely clogged. Thus, the controller 210 may identify, in the data 1000*a*, a zone 1006 corresponding to the malfunctioning nozzles 1004. If the zone 1006 includes an object, e.g. a part or all of an object, then such an object may be moved to different regions in the data, as will be described.

At 908, the data representing the three-dimensional object may be modified, based on the data representing the usage of the nozzles, to shift the coordinates of an object and/or cancel an object. For example, the shift may occur if the object was in a region of the data corresponding to a malfunctioning or over-used nozzle. The object may thus be shifted to a region in which the corresponding nozzles are functioning and/or under-used relative to the over-used nozzles. This may be done in a similar way as described earlier relative to 306 of FIG. 3, including modifying three-dimensional object data or slice data, and including the particular examples represented by FIGS. 4-7.

Additionally, in some examples, the detection of malfunctioning or over-used nozzles is made after part of the object has already been generated, for example initial slices have been generated using nozzles that have been identified as malfunctioning. In these examples, the object may be cancelled in the remainder of the data representing the object. This may, for example, be done so as not to waste build material on an object that is expected to be defective. In some examples, for example if space is available, generation of the object may be re-started at the new layer using functioning and/or under-used nozzles.

For example, in FIG. 10*a-b*, the data 1000*b* is generated based on modifications to the original data 1000*a*. The object 1002*a* is cancelled due to defects in the x-y zone 1006 of FIG. 10*a*. For example, the object 1002*a* is cancelled at a slice designated by 1008, such that the remainder of the object 1002*a* above the slice 1008 is cancelled. The object 1002*a* is then shifted such that a duplicate shifted object 1002*b* is generated. The object 1002*b* is shifted both in the x-direction to avoid the zone 1006 as shown in FIG. 10*a*, and in the z-direction upwards because of previous slices which have already been generated and which include the cancelled object 1002*a*. In other examples, after the object 1002*a* is cancelled, no other object, such as the object 1002*b*, may be added to the data 1000*b*.

At 910, as shown in FIG. 8*b*, coalescing agent 804 may be selectively delivered to the surface of portions of the layer 802*b*. This may be done in a similar way as described earlier relative to 310 of FIG. 3. As discussed earlier, in the examples of FIGS. 8*a-8d*, for illustrative purposes the patterns of the agent 804 correspond to cross-sectional side views of the object 402 defined in 400*b*. However, other patterns, including the patterns defined in data 500*b*, 600*b*, 600*c*, 700*b*, or 1000*b*, may be used.

At 912, a predetermined level of energy may be temporarily applied to the layer 802b of build material. This may be done in a similar way as described earlier relative to 312 of FIG. 3 to create solidified portion 808.

After a layer of build material has been processed as described above in 904 to 912, new layers of build material may be provided on top of the previously processed layer of build material. In this way, the previously processed layer of build material acts as a support for a subsequent layer of build material. The process of 904 to 912 may then be repeated to (1) generate a three-dimensional object layer by layer, and/or (2) modify data representing the three dimensional object to shift the coordinates of the object and/or to cancel the object.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A system comprising:
   a support member;
   a build material distributor to distribute a layer of build material onto the support member;
   an agent distributor to deliver an agent, wherein the agent distributor comprises a plurality of nozzles;
   a processor; and
   a non-transitory storage medium comprising instructions that upon execution on the processor cause the system to:
      receive nozzle data relating to a first nozzle of the agent distributor to be used to deliver the agent, wherein the nozzle data indicates that the first nozzle is over-used relative to other nozzles of the plurality of nozzles;
      modify data representing a three-dimensional object to cause shifting of coordinates of the three-dimensional object in the modified data such that the first nozzle is not to be used to generate the three-dimensional object, and a second nozzle different from the first nozzle is to be used to generate the three-dimensional object; and
      cause the three-dimensional object to be generated by controlling delivery of the agent using the second nozzle of the agent distributor and not the first nozzle in accordance with the modified data representing the three-dimensional object.

2. The system of claim 1, further comprising a nozzle sensor to detect usage of the first nozzle, wherein the nozzle data is based on a measurement by the nozzle sensor.

3. The system of claim 1, wherein the nozzle data is based on data representing previous use of the first nozzle in generating three-dimensional objects.

4. The system of claim 1, wherein the data representing the three-dimensional object comprises three-dimensional object design data.

5. The system of claim 1, wherein the data representing the three-dimensional object comprises slice data.

6. A system comprising:
   a support member;
   a build material distributor to distribute a layer of build material onto the support member;
   an agent distributor to distribute an agent, wherein the agent distributor comprises a plurality of nozzles;
   a processor; and
   a non-transitory storage medium comprising instructions that upon execution on the processor cause the system to:
      receive nozzle data relating to a first nozzle of the agent distributor to be used to deliver the agent;
      modify data representing a first three-dimensional object and a second three-dimensional object to:
         cause shifting of coordinates of the first three-dimensional object in the modified data such that the first nozzle is not to be used to generate the first three-dimensional object, and a second nozzle different from the first nozzle is to be used to generate the first three-dimensional object, and
         cancel the second three-dimensional object in the modified data such that the first nozzle is not used to generate the second three-dimensional object; and
      cause the first three-dimensional object to be generated by controlling delivery of the agent using the second nozzle of the agent distributor and not the first nozzle in accordance with the modified data.

7. The system of claim 1, wherein the data represents a plurality of three-dimensional objects, wherein the instructions upon execution cause the system to modify the data representing the plurality of three-dimensional objects to shift coordinates of the plurality of three-dimensional objects such that the first nozzle is not used to generate the three-dimensional object.

8. A system comprising:
   a support member;
   a build material distributor to distribute a layer of build material onto the support member;
   an agent distributor to distribute an agent, wherein the agent distributor comprises a plurality of nozzles;
   a processor; and
   a non-transitory storage medium comprising instructions that upon execution on the processor cause the system to:
      receive nozzle data relating to a first nozzle of the agent distributor to be used to deliver the agent;
      prior to a three-dimensional object being generated, modify data representing the three-dimensional object to cause shifting of coordinates of the three-dimensional object in the modified data such that the first nozzle is not to be used to generate the three-dimensional object, and a second nozzle different from the first nozzle is to be used to generate the three-dimensional object; and
      cause the three-dimensional object to be generated by controlling delivery of the agent using the second nozzle of the agent distributor and not the first nozzle in accordance with the modified data representing the three-dimensional object.

9. The system of claim 1, wherein the instructions upon execution cause the processor to receive the nozzle data and to modify the data representing the three-dimensional object during a build process for generating the three-dimensional object.

10. The system of claim 6, wherein the instructions upon execution cause the processor to modify the data representing the first three-dimensional object and the second three-dimensional object to cancel the second three-dimensional object while the second three-dimensional object is being generated.

11. The system of claim 1, wherein the shifting of the coordinates of the three-dimensional object moves the coordinates of the three-dimensional object out of a first region corresponding to the first nozzle to a second region corresponding to the second nozzle.

12. The system of claim 11, wherein the second region excludes the first region.

13. The system of claim 1, wherein the agent distributor is to deliver the agent to the layer of build material under control of the instructions upon execution on the processor.

14. The system of claim 1, further comprising an energy source to apply energy to the layer of build material.

15. The system of claim 6, wherein the nozzle data indicates that the first nozzle is malfunctioning.

16. The system of claim 15, further comprising a nozzle sensor to detect whether the first nozzle is at least partially clogged, wherein the nozzle data is based on a measurement by the nozzle sensor.

17. The system of claim 6, wherein the nozzle data indicates that the first nozzle is over-used relative to other nozzles of the plurality of nozzles.

18. The system of claim 6, wherein the shifting of the coordinates of the first three-dimensional object moves the coordinates of the first three-dimensional object out of a first region corresponding to the first nozzle to a second region corresponding to the second nozzle, and wherein the second region excludes the first region.

19. The system of claim 6, further comprising an energy source to apply energy to the layer of build material after the agent distributor has delivered the agent to portions of the layer of build material.

20. The system of claim 8, further comprising an energy source to apply energy to the layer of build material after the agent distributor has delivered the agent to portions of the layer of build material.

* * * * *